United States Patent
Lax (10) Patent No.: US 8,050,485 B2
(45) Date of Patent: Nov. 1, 2011

(54) SYSTEM FOR HIGH SPEED PROCESSING OF GAMING DOCUMENTS

(75) Inventor: Jacob Lax, Brooklyn, NY (US)

(73) Assignee: Cashscan Corporation, Brooklyn, NY (US)

( * ) Notice: Subject to any disclaimer, the term of this patent is extended or adjusted under 35 U.S.C. 154(b) by 1124 days.

(21) Appl. No.: 11/370,550

(22) Filed: Mar. 8, 2006

(65) Prior Publication Data
US 2007/0211931 A1   Sep. 13, 2007

(51) Int. Cl.
*G06K 9/00* (2006.01)
(52) U.S. Cl. ........................................................ 382/140
(58) Field of Classification Search .................. 382/135, 382/138, 139, 140; 463/29, 19; 700/95; 465/29, 19
See application file for complete search history.

(56) References Cited

U.S. PATENT DOCUMENTS

| | | | |
|---|---|---|---|
| 6,110,044 A * | 8/2000 | Stern | 463/29 |
| 6,459,806 B1 | 10/2002 | Raterman et al. | |
| 6,626,298 B2 | 9/2003 | Lax | |
| 6,748,101 B1 * | 6/2004 | Jones et al. | 382/135 |
| 6,843,418 B2 | 1/2005 | Jones et al. | |
| 2005/0060055 A1 * | 3/2005 | Hallowell et al. | 700/95 |
| 2005/0175230 A1 * | 8/2005 | Kortum et al. | 382/138 |
| 2005/0286752 A1 * | 12/2005 | Takiguchi | 382/139 |

* cited by examiner

*Primary Examiner* — Claire X Wang
(74) *Attorney, Agent, or Firm* — Robert L. Epstein; Epstein Drangel LLP (57) ABSTRACT

A system is provided for automatically processing gaming documents. The system obtains the dollar value of the document directly by optically identifying each dollar value characters from a scanned image of the document, instead of forwarding the bar-coded validation number to a remote database to ascertain the dollar value. This is achieved by storing a plurality of templates, each representative of a possible character of the dollar value. Optical character recognition is used to identify each dollar value character image by comparing each of the stored templates in turn with the image. The template with the highest degree of coincidence is selected. The value of the selected template is stored in ASCII format for display, validation and/or manipulation. Each document image is compressed. Periodically, the compressed document images of the documents processed during that period are transferred to a remote location for long term storage.

43 Claims, 5 Drawing Sheets

SYSTEM FOR HIGH SPEED PROCESSING OF GAMING DOCUMENTS

CROSS-REFERENCE TO RELATED APPLICATION

Not Applicable

STATEMENT REGARDING FEDERACY SPONSORED RESEARCH OR DEVELOPMENT

Not Applicable

REFERENCE TO A "SEQUENCE LISTING"

Not Applicable

BACKGROUND OF THE INVENTION

1. Field of Invention

The present invention relates to automated systems for processing documents and the like, and more particularly, to an automated system for the high speed processing of gaming documents such as betting slips, lottery tickets or the like, containing a printed dollar value and a bar-code validation number, using an automated apparatus of the type disclosed in U.S. Pat. No. 6,626,298, which has been modified to process gaming documents in an accurate, efficient, versatile and high speed manner without the necessity of forwarding the validation number to a remote location for identifying the dollar value of the betting document.

The apparatus disclosed in U.S. Pat. No. 6,626,298 is designed for high speed automated processing of currency bills. It utilizes an improved mechanical transport system, multiple scanning devices for information reading and sophisticated digital signal processing. It employs parallel 32-bit data processing units for increased speed. An 8-bit control circuit tracks the currency bills as they move through the apparatus, accurately regulates transport motor speed and operates the collection bin gates. That patent is incorporated herein by reference. The reader is referred to that patent for detailed information as to the operation of the apparatus disclosed therein.

Other automated currency processing machines are disclosed in U.S. Pat. No. 6,459,806 entitled "Method and Apparatus for Currency Discrimination and Counting" issued Oct. 1, 2002 to Raterman et al.; U.S. Pat. No. 6,748,101 entitled "Automatic Currency Processing System" issued Jun. 8, 2004 to Jones and U.S. Pat. No. 6,843,418 entitled "System and Method for Processing Currancy Bills and Documents Bearing Barcodes in a Document Processing Device" issued Jan. 18, 2005 to Jones, all assigned to Cummin-Allison Corp. of Mt. Prospect, Ill.

Race tracks and other types of gaming establishments utilize large numbers of paper documents such as betting slips which must be read and the read data converted for display, validation, manipulation and storage. While those tasks can be done manually, manual handling and copying of such documents is time consuming, labor intensive and may result in inaccuracies.

Clearly, there is a need for a system of performing those functions with an automated apparatus that can be connected directly to a computer. However, to be commercially successful, the apparatus upon which the processing is performed must be able to reliably scan the printed side of the document, read the information printed thereon, ascertain the dollar value of the gaming document and convert the scanned information into a format where it can be displayed, validated, manipulated and stored on a computer. The processing must be able to be executed on an apparatus capable of performing all of those functions in a high speed manner.

Further, for audit purposes, many casinos in the United States are required to store their slot tickets from six months to three years, depending upon the jurisdiction. Due to the large quantity of tickets involved, this creates tremendous warehousing problems.

There are automated betting document processing systems available but they operate by reading the bar-coded validation number and using that number to access a remote database to ascertain the dollar value printed on the document. They are not capable of creating a high resolution image of the betting document, accurately ascertaining the dollar value from the image and processing the information obtained in an efficient and high speed manner. Nor are they able to compress the image and download the compressed image to a remote optical drive for long term storage.

It is, therefore, a prime object of the present invention to provide a system for high speed processing of gaming documents without the necessity of forwarding the validation number to a remote location to obtain the dollar value of the gaming document.

It is another object of the present invention to provide a system of high speed processing of gaming documents that can be preformed on fully automated apparatus capable of scanning the printed side of the document to create an image, locating and accurately reading the dollar value information from the image and converting same into a format for display, validation, manipulation and/or storage on a computer in an efficient and high speed manner.

It is another object of the present invention to provide a system of high speed processing of gaming documents which can process documents whether they are oriented right side up or upside down.

It is another object of the present invention to provide a system of high speed processing of gaming documents capable of identifying the dollar value printed on the document using optical character recognition and then converting same to an ASCII format through the use of templates which are compared to each of the characters.

It is another object of the present invention to provide a system of high speed processing of gaming documents capable of creating a high resolution image of the document, compressing storing the image and downloading the compressed image to a remote optical drive for long term storage.

2. Description of Prior Art

To the best of applicant's knowledge, there is no automated system of processing gaming documents in a high speed accurate manner that operates without having to access a remote database to ascertain the dollar value of the gaming document using the read bar-code validation number. In particular, there is no processing system that is capable of capturing a high resolution image of the printed side of the gaming document, locating the printed dollar value on the image, and identifying the dollar value using optical character recognition in order to convert the data into ASCII format for display, validation and/or manipulation using a plurality of templates to identify the individual characters.

Further, there is no automated gaming document processing system which compresses a high resolution scanned image of the document and stores the compressed image on a local hard drive for downloading to a remote optical drive for long term storage.

BRIEF SUMMARY OF THE INVENTION

In accordance with the present invention, apparatus is provided for automatically processing of gaming documents of the type having a bar-coded validation number and a dollar value printed on one side thereof. The apparatus includes means for storing a plurality of templates, each representative of a possible character of the printed dollar value. Means are provided for scanning the printed side of the gaming document and producing an image of each character of the dollar value printed thereon. Means are provided for identifying each dollar value character image using optical character recognition by comparing said stored templates and the dollar value character images. Means are provided for selecting the template with the highest degree of match with the dollar value character image. Means are provided for storing the value of the selected template in ASCII format for display, validation and/or manipulation.

The apparatus also includes means for reading the validation number from the gaming document image, means for converting the read validation number into validation data representative thereof, means for generating date data, and means for storing value, the validation data and the date data.

The scanning means includes means for identifying the orientation of the gaming document. The scanning means includes means for searching a section of the document for the location of the dollar value, depending upon identified orientation.

The template selecting means includes means for placing the stored templates, in turn, over each dollar value character image. It also includes means for locating a reference point on the dollar value character image. The means for locating a reference point includes means for moving along the character of the dollar value character image in a first direction until a black area is encountered. It also includes means for moving along the dollar value character image in a second direction until a black area is encountered.

The template selecting means further includes means for placing the stored templates over each dollar value character image, using said reference point to position each template relative to the dollar value character image, and means for scoring the number of black pixels on the template that coincide with the black areas on the dollar value character image.

The means for scoring includes means for determining the number of white pixels of the template that coincide with the number of white areas on the dollar value character image. The scoring means also includes means for determining which template has the greatest number of black pixels and white pixels coincident with the black areas and white areas on the dollar value character image.

Means are provided for making the dollar value character image darker and for reactivation of the means for placing said stored templates, in turn, over each dollar value character image, if the dollar value character image is not dark enough to select a template.

Preferably, the template storing means stores a different template for each numeral.

The means for scoring includes means for determining when at least 9 black pixels of a template coincide with the black area of the character image and at least 9 white pixels of the template coincide with the white area of the character image.

The apparatus also includes means for creating an image of the document, means for compressing the document image and means for storing the compressed document image. Means are provided for transferring the stored compressed document image to a remote location for long term storage.

In accordance with another aspect of the present invention, a method is provided for automatically processing of gaming documents of the type having a bar-coded validation number and a dollar value printed on one side thereof. The method includes storing a plurality of templates, each representative of a possible character of the printed dollar value. The printed side of the gaming document is scanned and an image of each character of the dollar value printed thereon is produced. Each dollar value character image is identified using optical character recognition by comparing the stored templates to each dollar value character image. The template is selected with the highest degree of match with the dollar value character image. The value of the selected template is stored in ASCII format for display, validation and/or manipulation.

The method also includes the steps of reading the validation number from the gaming document image, converting the read validation number into validation data representative thereof, generating date data, and storing the dollar value, the validation data and the date data.

The step of scanning includes identifying the orientation of the gaming document. It also includes searching a section of the document for the location of the dollar value, depending upon identified orientation.

The step of selecting a template includes the step of placing the stored templates, in turn, over each dollar value character image. It also includes the step of locating a reference point on the dollar value character image to insure proper registration of the template with the dollar value character image.

The step of locating a reference point includes the step of moving along the dollar value character image in a first direction until a black area is encountered. It also includes the step of moving along the dollar value character image in a second direction until a black area is encountered.

The step of selecting a template further includes steps of placing the stored templates over each dollar value character image, using the reference point to position the template relative to the dollar value character image, and scoring the number of black pixels on the template that coincide with black areas on the dollar value character image.

The step of scoring further comprises the step of determining the number of white pixels of the template that coincide with white areas on the dollar value character image. It also includes the step of determining which template has the greatest number of black pixels and white pixels coincident with the black areas and white areas of each dollar value character image.

The method further includes the step of making the dollar value character image darker and again placing the stored templates, in turn, over each dollar value character image, in the event that the value of the dollar value character image cannot be ascertained.

The step of storing templates includes storing a different template for each numeral.

The step of scoring includes the step of determining when at least 9 black pixels of a template coincide with the black area of the dollar value character image and at least 9 white pixels of the template coincide with the white area of the dollar value character image.

The method also includes the steps of creating an image of the document, compressing the document image and storing the compressed document image. The stored compressed document image is transferred to a remote location for long term storage.

BRIEF DESCRIPTION OF DRAWINGS

To these and to such other objects which hereinafter appear, the present invention relates to a system for high speed processing gaming documents as described in detail in the following specification and recited in the annexed claims, taken together with the accompanying drawings, in which like numerals refer to like parts, and in which:

DETAILED DESCRIPTION OF THE INVENTION

Figure 1:
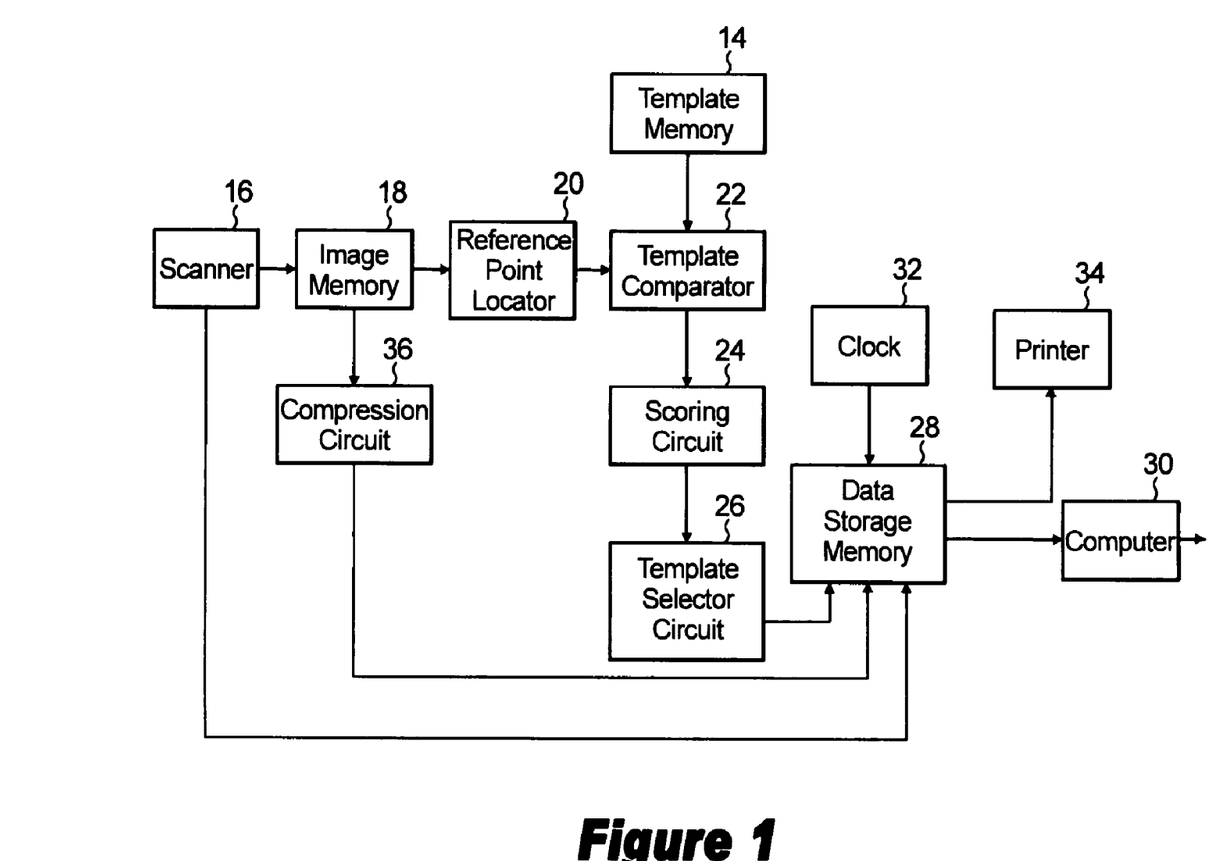
FIG. 1 is a block diagram of the apparatus for processing gaming documents in accordance with the system of the present invention.
Figure 5:
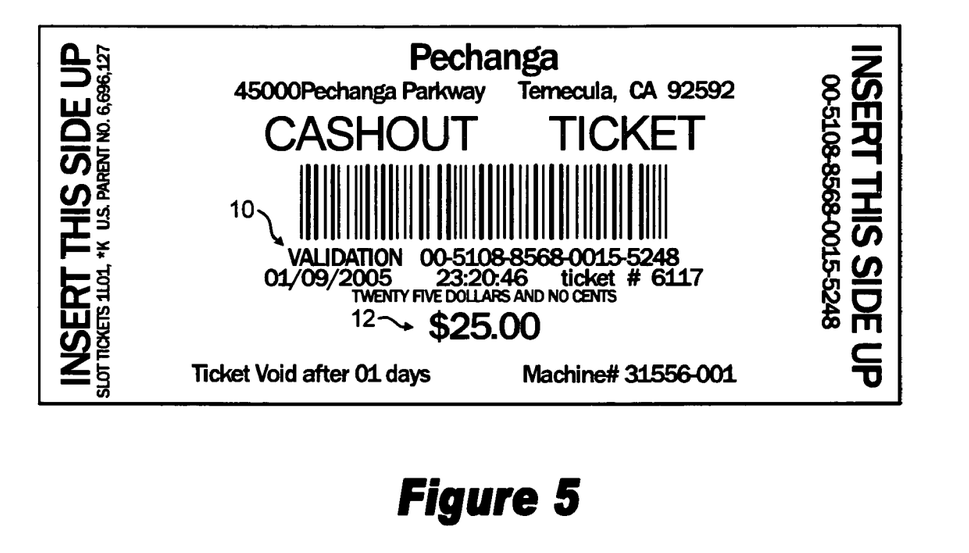
FIG. 5 is an image of a typical gaming document.

The apparatus for automatically processing of gaming documents is illustrated in block form in FIG. 1. It is designed to process various types of gaming documents, generally designated A, such as the betting ticket illustrated in FIG. 5 that include a bar-coded validation number 10 and a dollar value 12, both of which are printed on the same side of the document.

The apparatus includes a memory 14 capable of storing at least twelve different templates. Each of the twelve stored templates is representative of a different possible character of the printed dollar value. The stored templates include a template for a dollar sign ($), a template for a decimal point (.) and templates for each of the numerals 0, 1, 2, 3, 4, 5, 6, 7, 8 and 9.

An optical scanner 16 is used for scanning the printed side of gaming document A and creating a high resolution image thereof. The document image, including the image of each character of the dollar value 12 printed thereon, is stored in an image memory 18. The document image is initially in Bitmap format which is 1 MB in size.

The image of each dollar value character is transferred, in turn, from memory 18 to a reference point location circuit 20. Circuit 20 locates a reference point on each dollar value character such that each of the stored templates can be placed over the image in the correct position.

That occurs in a template comparison circuit 22 which is connected to reference point locator circuit 20 and to template memory 14. Template comparison circuit 22 is also connected to a scoring circuit 24. Template comparison 22 and scoring circuit 24 function together as a means for identifying each dollar value character image through the use of optical character recognition by comparing the stored templates and the dollar value character images.

The output from scoring circuit 24 is feed to the template selecting circuit 26. Circuit 26 functions as a means for selecting the template with the highest degree of match with the dollar value character image under consideration. The value of the selected template is stored in local storage memory 28 which is part of the hard drive of the apparatus. The value of the selected template is stored in ASCII format. Memory 28 is connected to an external computer 20, such as a conventional PC. Computer 30 is capable of displaying, validating and/or manipulating the value data as necessary. The value data also can be printed by printer 34, if desired. Computer 30 may forward the stored value data to a remote location via the Internet or other network for validation of the winning documents at a later time.

The bar-coded validation number 10 is also ascertained from the document image and converted into validation data representative of validation number 10. The validation data is transferred to and stored in local storage memory 28. A clock circuit 32 provides the local storage memory with data representative of the date. The value data, the validation data and the date data for each gaming document are stored together in a file in local memory 28.

Figure 2:
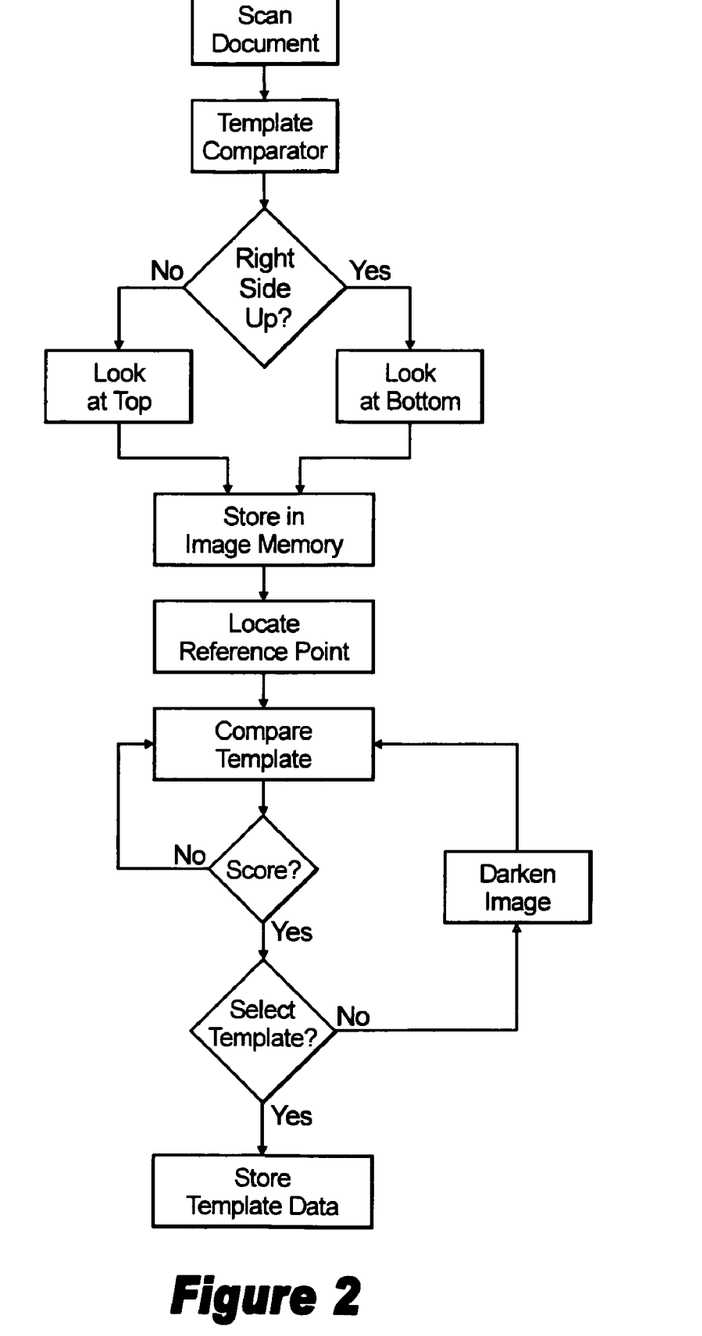
FIG. 2 is a flow chart of the character recognition portion of the process of the present invention.

FIG. 2 illustrates the character recognition portion of method of the present invention in greater detail. Before apparatus can determine where on the document image to look for the dollar value, it must determine if the document image being processed is right side up or upside down. Thus, prior to processing, the document image in image memory 18 is identified as being right side up or up side down.

Once the orientation is ascertained, the image memory can search the appropriate section of the document image for the dollar value. If the document image is right side up, the bottom section will be searched. If it is upside down, the top section will be searched. In either case, an image of each of the characters of the dollar value, including the dollar sign and decimal point, will be stored.

Figure 3:
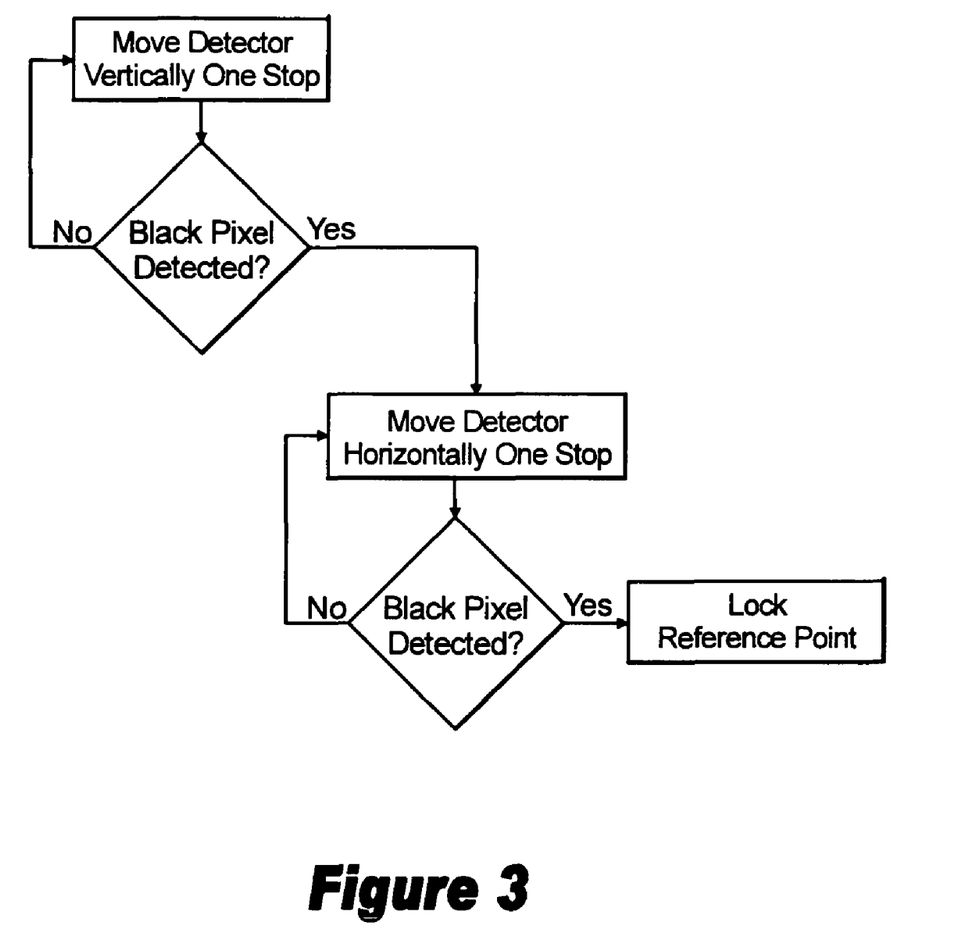
FIG. 3 is a flow chart of the reference point location and locking process of the present invention.

Each dollar value character image is transferred, in turn, from the image memory to the reference point locator. As illustrated in FIG. 3, the reference point of the transferred dollar value character image is located using a locator, for example, in the form of an upside down "L". The locator is placed over the image and is first moved vertically relative to the image until it coincides with the first encountered black pixel of the image. Then the locator is moved horizontally relative to the image until it coincides with the first encountered black pixel of the image. The upside down "L" locator is then locked in position over the image and acts as a reference point of that image.

Referring back to FIG. 2, once the reference point for the dollar value character image is determined, each of the twelve templates is placed over the image, in turn, using the locator as a guide to obtain proper registration between the template and the image. After the template is properly aligned, a comparison is made using ten selected black pixels and ten selected white pixels. Based upon the comparison, a score is created based upon the degree of coincidence between the image and the template. In order to be considered to be a "match" at least 9 black pixels of the template must coincide with the black areas of the image and at least 9 white pixels of the template must coincide with white areas around the character in the image.

Using that criteria, when a template score indicates that level of coincidence with the image, it will represent a much higher degree of coincidence than will be obtained from any of the other eleven templates and thus the "match" will have a high degree of reliability. The template selector circuit will then generate dollar value character image data to the local storage memory that is representative of the selected template.

In the event that the dollar value character image cannot be identified because no "match" is made after each of the templates has been compared with the image, the image is automatically made darker. The template comparison process is repeated using the darkened image. If no "match" still can be obtained, the image is darkened further and the template comparison is made again. If no "match" can be obtained at this point, the gaming document is transported to a special bin in the apparatus reserved for manual handling.

Figure 4:
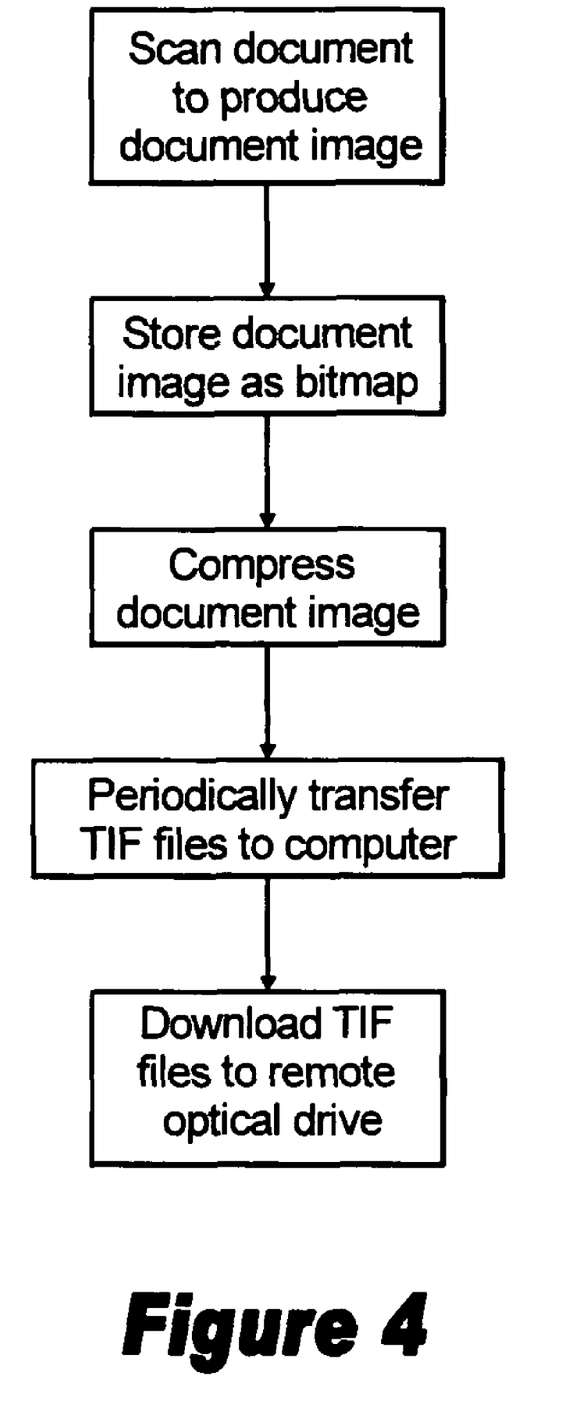
FIG. 4 is a flow chart of the long term storage portion of the process of the present invention.

For purposes of long term storage, the method steps of which are illustrated by the flow chart of FIG. 4, the document image in Bitmap format in image memory 18 is transferred to a compression circuit 36. Circuit 36 compresses the 1 MB image to approximately 20K and saves the compressed image as a TIF file. That TIP file of the compressed document image is then stored in local memory 38. After a given time period, for example 24 hours, the TIP files containing the compressed images of the gaming documents process during that time period may be transferred a remote location for long term storage. This may be accomplished by periodically transferring the TIP file contents of the local memory to the computer which then downloads the files through the Internet or other network to a remote optical drive capable of retaining the files for future reference.

It will now be appreciated that the present invention relates to a system for high speed processing of gaming documents that is capable of obtaining the dollar value of the gaming. document directly from the document image, eliminating the necessity of forwarding the bar-coded validation number to a remote database for that purpose. That is achieved in the present invention by using a unique process for identifying each dollar value character image as an ASCII character using a series of templates which are matched to the image and selecting the template with the greatest coincidence with the image. Further, the system is capable of compressing each document image and periodically transferring the compressed document images to a remote location for long term storage.

While only a single preferred embodiment of the invention has been disclosed for purposes of illustration, it is obvious that many variations and modifications could be made thereto. It is intended to cover all of these variations and modifications which fall within the scope of the invention, as defined by the following claims:

I claim:

1. A method for automatically processing of gaming documents of the type having dollar value characters printed on a side thereof; the method comprising the steps of:
   (a) storing a plurality of templates, each of the templates representing a different possible dollar value character;
   (b) scanning the printed side of the document;
   (c) storing an image of the scanned printed side of the document, including the dollar value characters;
   (d) identifying the value of each of the dollar value characters of the stored image by:
      (i) selecting a dollar value character for value identification;
      (ii) locating a reference point on the selected dollar value character based upon finding the first encountered black pixel of the image;
      (iii) comparing each of the stored templates in turn with the selected dollar value character using the reference point for the selected dollar value character for positioning of each template with respect to the selected dollar value character;
      (iv) identifying the stored template having the highest degree of match with the selected dollar value character;
      (v) storing the value represented by the identified template; and
      (vi) repeating steps (i) through (v) until the value of each dollar value character of the stored image has been identified and stored.

2. The method of claim 1 wherein the step of comparing the stored templates comprises the step of comparing the stored templates using optical character recognition.

3. The method of claim 1 wherein the document has a bar coded validation number printed thereon and further comprising the steps of reading the validation number from the gaming document, converting the read validation number into validation data representative thereof, and storing the validation data.

4. The method of claim 1 wherein the strep of scanning the printed side of the document comprises the step of identifying the orientation of the document.

5. The method of claim 1 wherein the step of identifying the template with the highest degree of match comprises the step of placing the stored templates, in turn, over each dollar value character image.

6. The method of claim 5 further comprising the step of making the dollar value character image darker and again placing the stored templates, in turn, over each dollar value character image.

7. The method of claim 1 wherein the step of comparing the stored templates comprises the step of locating a reference point by moving along the dollar value character image in a first direction until a black area is encountered.

8. The method of claim 7 wherein the step of locating a reference point further comprises the step of moving along the dollar value character image in a second direction until a black area is encountered.

9. The method of claim 1 wherein the step of identifying the template having the highest degree of match comprises the steps of placing the stored templates over each dollar value character image, and scoring the number of black pixels on the template that coincide with black areas on the dollar value character image.

10. The method of claim 9 wherein the step of scoring further comprises the step of determining the number of white pixels of the template that coincide with white areas on the dollar value character image.

11. The method of claim 9 wherein the step of scoring means comprises the step of determining which template has the greatest number of black pixels and white pixels coincident with the black areas and white areas of each dollar value character image.

12. The method of claim 9 wherein the step of scoring comprises the step of determining when at least 9 black pixels of a template coincide with the black area of the dollar value character image and at least 9 white pixels of the template coincide with the white area of the dollar value character image.

13. The method of claim 1 wherein the step of storing templates comprises storing a different template for each numeral.

14. The method of claim 1 further comprising the steps of: creating an image of the document, compressing the document image and storing the compressed document image.

15. The method of claim 14 further comprising the step of transferring the stored compressed document image to a remote location for long term storage.

16. The method of claim 1 further comprising the steps of: scanning the entire printed side of the document with a single optical scanner to create a high resolution image thereof; compressing the document image; and storing the compressed document image.

17. The method of claim 16 further comprising the step of formatting the document image as a Bitmap.

18. The method of claim 16 further comprising the step of compressing the document image as a TIF file.

19. The method of claim 18 further comprising the step of storing the TIF file.

20. The method of claim 19 further comprising means for transferring the stored TIF file.

21. The method of claim 16 further comprising means for periodically transferring the contents of the storage means to a computer.

22. The method of claim 1 wherein the step of scanning the printed side of the document comprises the step of creating an image of the scanned side of the document in Bitmap format which is 1 MB in size.

23. The method of claim 1 wherein the step of storing the value represented by the identified template comprises the step of storing the value in ASCII format.

24. Apparatus for automatically processing of gaming documents of the type having dollar value characters printed on a side thereof comprising means for storing a plurality of templates, each of the templates representing a different possible dollar value character; means for scanning the printed side of the document; means for storing an image of the scanned printed side of the document, including the dollar value characters; means for identifying the value of each of the dollar value characters of the stored image comprising means for selecting a dollar value character for value identification; means locating a reference point on the selected dollar value character based upon the first encountered black pixel of the image; means for comparing each of the stored templates in turn with the selected dollar value character using the reference point for the selected dollar value character for positioning of each template with respect to the selected dollar value character; means for identifying the stored template having the highest degree of match with the selected dollar value character; means for storing the value represented by the identified template; and means for repeatedly activating said value identifying means until the value of each dollar value character of the stored image has been identified and stored.

25. The apparatus of claim 24 wherein said means for comparing comprises optical character recognition means.

26. The apparatus of claim 24 wherein the document has a bar coded validation number printed thereon and further comprising means for reading the validation number, means for converting said read validation number into validation data representative thereof, and means for storing said validation data.

27. The apparatus of claim 24 wherein said template identifying means comprises means for placing said stored templates, in turn, over each said dollar value character images.

28. The apparatus of claim 27 further comprising means for making the dollar value character image darker and for reactivation of said means for placing said stored templates, in turn, over each said dollar value character image.

29. The apparatus of claim 24 further comprising means for locating a reference point by moving along the character of the dollar value character image in a first direction until a black area is encountered.

30. The apparatus of claim 29 wherein said means for locating a reference point further comprises means for moving along the dollar value character image in a second direction until a black area is encountered.

31. The apparatus of claim 24 wherein said template identifying means further comprises means for placing said stored templates over each of said dollar value character images, using said reference point to position each template relative to the dollar value character image, and means for scoring the number of black pixels on the template that coincide with the black areas on the dollar value character image.

32. The apparatus of claim 31 wherein said means for scoring further comprises means for determining the number of white pixels of the template that coincide with the number of white areas on the dollar value character image.

33. The apparatus of claim 32 wherein said scoring means comprises means for determining which template has the greatest number of black pixels and white pixels coincident with the black areas and white areas on the dollar value character image.

34. The apparatus of claim 31 wherein said means for scoring comprises means for determining when at least 9 black pixels of a template coincide with the black area of the character image and at least 9 white pixels of the template coincide with the white area of the character image.

35. The apparatus of claim 24 wherein said template storing means stores a different template for each numeral.

36. The apparatus of claim 24 wherein the means for scanning the printed side of the document comprises means for creating an image of the scanned side of the document in Bitmap format which is 1 MB in size.

37. The apparatus of claim 36 further comprising means for creating an image of the document, means for compressing the document image and means for storing the compressed document image.

38. The apparatus of claim 37 further comprising means for transferring the stored compressed document image to a remote location for long term storage.

39. The apparatus of claim 37 further comprising means for compressing the document image as a TIF file.

40. The apparatus of claim 39 further comprising means for storing the TIF file.

41. The apparatus of claim 40 further comprising means for transferring the stored TIF file.

42. The apparatus of claim 24 further comprising means for periodically transferring the contents of the storage means to a computer.

43. The apparatus of claim 24 wherein the means for storing the value represented by the identified template comprises means for storing the value in ASCII format.

* * * * *